United States Patent [19]

Durand

[11] 4,295,725

[45] Oct. 20, 1981

[54] PHOTOGRAPHIC SHUTTER

[75] Inventor: Roger Durand, Ballaigues, Switzerland

[73] Assignee: Pignons S.A., Ballaigues, Switzerland

[21] Appl. No.: 83,614

[22] Filed: Oct. 11, 1979

[30] Foreign Application Priority Data

Oct. 19, 1978 [CH] Switzerland ............... 10808/78

[51] Int. Cl.³ .................................. G03B 9/34
[52] U.S. Cl. ................................... 354/244
[58] Field of Search ..................... 354/241–244

[56] References Cited

U.S. PATENT DOCUMENTS

| | | | |
|---|---|---|---|
| 3,739,704 | 6/1973 | Akiyama | 354/243 |
| 3,744,392 | 7/1973 | Dahlgren et al. | 354/243 X |
| 4,053,913 | 10/1977 | Sato | 354/244 |
| 4,109,265 | 8/1978 | Hashimoto | 354/244 |
| 4,123,766 | 10/1978 | Hasegawa | 354/243 X |

*Primary Examiner*—L. T. Hix
*Assistant Examiner*—Thomas H. Tarcza
*Attorney, Agent, or Firm*—Emory L. Groff, Jr.

[57] ABSTRACT

The photographic shutter has two curtains cut out of a sheet of synthetic material. The flexible return of the curtain is ensured by two drum springs engaging with pinions carried by the end of the rollers. The setting of the shutters may be effected by wheels which may be completely disconnected from the setting mechanism. Release may be effected electrically by electro-magnets.

4 Claims, 5 Drawing Figures

FIG.1 FIG.2
FIG.3 FIG.5 FIG.4
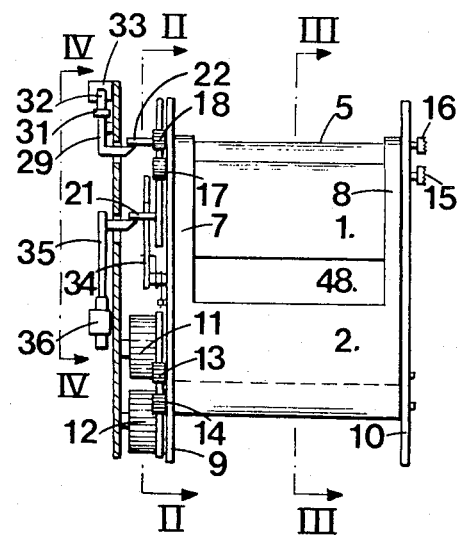
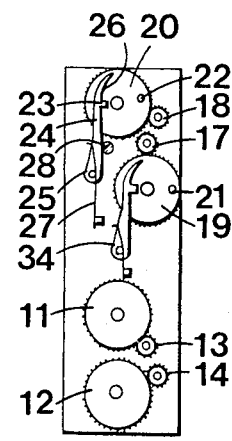
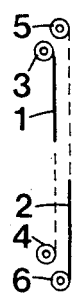
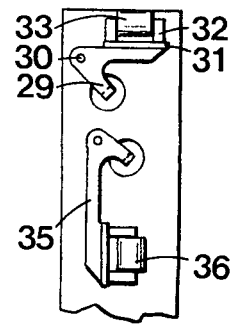
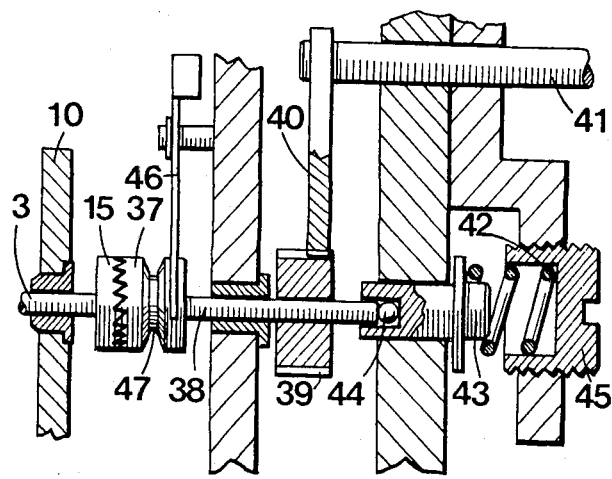

PHOTOGRAPHIC SHUTTER

The present invention relates to a photographic shutter with curtains.

Shutters with curtains are well-known amongst focal-plane type shutters. These have two flexible curtains, each curtain being attached by one of its edges to a first roller forced in the winding direction by a spring, each curtain being connected by two flexible strips to a second roller which is coupled to a setting mechanism to draw the curtain against the action of the said spring and to a trip locking mechanism, this locking mechanism operating to unlock and disconnect successively the second rollers.

These shutters are robust and usually have a long life. The curtains are in general made of light silk and are connected to one of the rollers by fitted flexible strips made of a material stronger than silk. These shutters are sensitive to various factors and, in particular, the curtains risk being burned if the lens is pointed towards the sun, or on the contrary may freeze up when they are exposed to damp cold. The latter may substantially slow down the speed of movement and falsify the exposure time. Finally, at the time of their operation, the weights to be moved are relatively high, so that the curtains undergo substantial acceleration over their stroke. The flexible pushing of each curtain is effected by a spring, accomodated in a roller, which leads to the provision of rollers of a relatively large diameter and therefore having considerable inertia. Moreover the arrangement of a spring in a roller is tricky and is often the cause of friction which is difficult to control, the said friction having a harmful influence on the accuracy of the exposure time.

The purpose of this inventin is to create a shutter with strips in which the foregoing disadvantages are greatly diminished if not completely eliminated.

According to the present invention there is provided a photographic shutter comprising two flexible curtains each curtain being attached by one of its edges to a first roller urged in the winding direction by a spring, each curtain being connected by two flexible strips to a second roller which is coupled, on the one hand, to a setting mechanism for drawing the curtain against the action of the said spring and, on the other, to a strip locking mechanism, this locking mechanism operating to unlock successively the second rollers, each curtain being made of synthetic material and formed integrally with said flexible strips, each first roller being coupled by one of its ends to a spring loaded device located at the end of the roller the second rollers having at one of their ends a coupling device which can be tripped, connecting them to the setting mechanism.

An embodiment of the present invention will now be described by way of example only, with reference to the accompanying drawings in which:

FIG. 1 shows a shutter along a view parallel to the plane of the film.

FIG. 2 is a section along II—II of FIG. 1.

FIG. 3 is a section along III—III of FIG. 1.

FIG. 4 is a view along IV—IV of FIG. 1.

FIG. 5 shows a detail of the setting mechanism.

A shutter has in the known manner two curtains 1 and 2 which are each attached between two rollers 3, 4 or 5, 6. Curtains 1 and 2 are cut out of a sheet of synthetic material, for example a sheet of MYLAR (registered Trade Mark). As shown in FIG. 1, curtain 2 is in one piece with two flexible strips 7, 8 which wind on roller 5. The synthetic material used has a great solidity and may therefore be very thin and have little weight. The result of this is that all the rollers may consist of a small-diameter rod the moment of inertia of which is very low.

Rollers 3 to 6 are rotatably mounted on and between two plates 9 and 10. Rollers 4 and 6 are subjected to a flexible torque exercised by two springs mounted in drums 11 and 12 engaging respectively with pinions 13 and 14 which are each attached to one of the said rollers.

Rollers 3 and 5 each carry a wheel with frontal teeth 15, 16, provided for the setting of the shutter, that is to say to draw curtains 1 and 2 against the return action of drums 11 and 12.

Rollers 3 and 5 have, at their ends opposite the ends carrying wheels 15 and 16, toothed wheels 17 and 18. The latter each engage with the wheel 19, or 20 fitted with a stud 21, or 22, projecting from the side of said wheels. During rotation of wheel 20, stud 22 co-operates with either of the two sides of a pawl 23 carried by an arm 24 hinged at 25. This arm 24 has a section 26 in the form of a ramp intended to exert a rubbing action on stud 22 at the end of the stroke of the shutter. Arm 24 is urged by a spring 27 against a stop 28 which consists of an eccentric head screw, which allows adjustment of the position of this stop.

When the shutter is in the set or armed position, stud 22 is placed below pawl 23, with reference to FIG. 2. This stud 22 is held in this position by the curved end of a ratchet 29, as shown in FIG. 4. This ratchet 29 constitutes the movable element of an electric repulsion magnet. For this purpose ratchet 29 is hinged at 30 and carries a permanent magnet 31 arranged against the branches of a fixed and U shaped fitting 32 on which a winding 33 is placed.

To release ratchet 29 it is sufficient to send a current pulse into the winding which produces in fitting 32 a magnetic polarisation opposite to that of magnet 33. This arrangement is an advantage for it makes it possible to obtain at the beginning of the stroke the maximum release of magnetic repulsion power and makes it possible to avoid the need for a return spring for ratchet 29, for as soon as the current in winding 33 is interrupted, magnet 31 produces a power of attraction towards fitting 32.

The release of roller 3 is effected exactly in the same way as for roller 5, by an arm 34 and a ratchet 35 controlled by an electric repulsion magnet 36.

FIG. 5 shows on a larger scale part of the setting mechanism co-operating with wheel 15 with frontal teeth for driving roller 3. Driving of wheel 15, the teeth of which are in the form of sawteeth, is effected by a wheel 37 with corresponding frontal teeth fixed on a shaft 38 integral with a toothed pinion 39. This pinion may be driven by a toothed sector 40 carried by shaft 41 of the usual setting lever of photographic equipment.

Shaft 38 is pushed in the direction of roller 3 by a spring 42, by the means of a sliding sleeve 43 comprising a ball 44 forming a thrust bearing with the end of the shaft 38. This spring 42 is intended to keep wheel 37 engaged with wheel 15. Due to the sawtoothing, this assembly acts as a self-tripping torque limiter. In fact when the setting stroke of curtain 1 is completed, that is to say when stud 21 butts against the nose of arm 34, wheel 15 is locked in rotation. Continuing the stroke of the setting mechanism, wheel 37 continues to turn and, due to the inclination of its toothing, is pushed axially against the action of spring 42. The force of this spring may moreover be adjusted by a screw 45 which acts as a fixed support for it.

At the time of the axial movement of wheel 37, a ratchet 46, subjected to the action of a spring which is not shown, engages in a groove 47 on wheel 37. This groove opens outwards so that, under the action of the spring of ratchet 46, the introduction of this ratchet into the groove produces an additional axial movement of shaft 38, which completely releases the toothing of wheels 15 and 37.

For the setting of curtain 2, the driving of wheel 16 is effected in the same way as for wheel 15 and by the same toothed sector 40. Axial locking of the driving wheel which is not shown of wheel 16 may be achieved by a second arm of ratchet 46 co-operating with a groove in this driving wheel.

At the time of release of the shutter, the exposure time is determined by the interval separating two current pulses sent respectively into the electric magnets controlling the release of curtain 2, then curtain 1. Depending on the exposure duration, the shutter completely uncovers the exposure window in the event that curtain 2 has completed its stroke before the commencement of the stroke of curtain 1. If the exposure time is very short the two curtains move at the same time causing the passage of a slot 48 (FIG. 1) before the exposure window, as is standard in shutters with curtains.

It should be noted that during the operation of the shutter, wheels 15 and 16 are disconnected from the driving mechanism and this avoids any friction on the side of this mechanism. In addition the moving parts are light and have little inertia, while the drum springs may be easily produced to avoid any friction between their turns. This arrangement, in combination with the lightness of the material constituting curtains 1 and 2 (MYLAR = polyethylene terephthalate), gives the assembly very low inertia. The result of this is that in a shutter for size 24 × 36 mm, a duration of movement of each curtain of around 1/250 of a second is achieved evenly.

Moreover the material used for the curtains eliminates any problem when the shutter operates under icy conditions. This material also makes it possible to obtain the curtain by simple cutting out and the two flexible strands which extend it, which considerably reduces the cost of manufacture. In addition the shutter has a small number of parts which are light and simple, which contribute to reducing the costs of construction. The braking effect exercised by arms 24 and 34 on studs 22 and 21 reduces the speed of the rollers at the end of the shutter stroke, which also reduces the loads exercised, as well as the noise.

After operation of the shutter, it is reset and the setting mechanism causes, by means which are not shown, a tipping of ratchet 46 to release the driving wheels of wheels 15 and 16. The two curtains 1 and 2 which partially overlap to avoid any passage of light, are then brought into the initial position at the same time and against the action of drum springs 11 and 12.

I claim:

1. A photographic shutter comprising two flexible curtains, each curtain attached by one of its edges to a first roller urged in a winding direction by a spring, each of said curtains connected by two flexible strips to a second roller which is connected, on the one hand, to a setting mechanism for drawing the curtain against the action of the said spring and on the other hand, to a trip locking mechanism, said locking mechanism operating to successively unlock said second rollers, each curtain made of synthetic material and formed integrally with said flexible strips, means connecting each said first roller at one of its ends to a spring loaded device located at the end of said roller, said second rollers having at one of their ends a coupling device which can be tripped and connecting them to said setting mechanism, said second rollers co-operating with said locking mechanism at their end opposite the end having said coupling device, each second roller provided at one of its ends with a toothed pinion engaging with a toothed wheel of larger diameter, said toothed wheel including a stud projecting from one side thereof, said stud co-operating on the one hand with the locking mechanism and, on the other hand, with a stop fixing the position of the curtain at the end of operation of the shutter, said stop comprising a pawl of an arm forced against said stop by a spring, said arm having a ramp adjacent to said pawl, said ramp exerting a resilient rubbing action against said stud before it butts against said pawl.

2. A shutter as claimed in claim 1, in which the locking mechanism includes a mobile stop placed in the path of each of the said studs, each of these stops being movable under the action of an electric repulsion magnet.

3. A shutter as claimed in claim 2, in which each coupling device comprises two wheels having frontal teeth in the form of sawteeth, one wheel being pushed against the other by a spring to make the two sets of teeth co-operate, the inclination of the diagonal faces of the sawteeth having been selected to constitute a torque limiter adjustable by the pressure of the spring.

4. A shutter as claimed in claim 3, in which said wheel pushed by said spring is associated with an axial retaining groove, said groove being brought into an active retaining position by the axial movement of this wheel resulting from the operation of the torque limiter.

* * * * *